United States Patent
Adcock et al.

(10) Patent No.: US 11,827,363 B2
(45) Date of Patent: Nov. 28, 2023

(54) COMPOSITE SEAT BOTTOM DIAPHRAGM

(71) Applicant: B/E Aerospace, Inc., Winston-Salem, NC (US)

(72) Inventors: Christopher Adcock, Advance, NC (US); Ryan J. Suhre, Winston-Salem, NC (US); Stephen A. Puglisi, Greensboro, NC (US); Gianpaolo Malatrasi, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 9 days.

(21) Appl. No.: 17/697,262

(22) Filed: Mar. 17, 2022

(65) Prior Publication Data
US 2023/0294832 A1 Sep. 21, 2023

(51) Int. Cl.
*B64D 11/06* (2006.01)

(52) U.S. Cl.
CPC ............................. *B64D 11/0647* (2014.12)

(58) Field of Classification Search
CPC .. B64D 11/0647; B64D 11/06; B60N 2/7094; B60N 2/70; B60N 2/7041; B60N 2/7058; B60N 2/7011; A47C 7/30; A47C 31/02; A47C 31/023; A47C 5/06
USPC ...................................................... 297/284.2
See application file for complete search history.

(56) References Cited

U.S. PATENT DOCUMENTS

| | | | |
|---|---|---|---|
| 5,485,976 A * | 1/1996 | Creed ................. | B64D 11/0649 297/452.55 |
| 6,739,671 B2 * | 5/2004 | De Maina ............ | B60N 2/7029 297/440.22 |
| 8,272,694 B2 | 9/2012 | Hawkins et al. | |
| 8,550,564 B1 | 10/2013 | Kismarton et al. | |
| 8,782,835 B2 | 7/2014 | Pozzi | |
| 9,580,175 B2 | 2/2017 | Velasco et al. | |
| 10,144,515 B2 * | 12/2018 | Le .............................. | B60N 2/85 |
| 10,518,886 B2 | 12/2019 | Velasco | |
| 10,661,905 B2 * | 5/2020 | Schumm ........... | B64D 11/0647 |
| 10,669,030 B1 | 6/2020 | Morse et al. | |
| 10,766,622 B2 * | 9/2020 | Abelheira .......... | B64D 11/0647 |
| 11,089,880 B1 * | 8/2021 | Suhre ................. | B64D 11/0649 |
| 11,203,434 B2 | 12/2021 | D'Alessio et al. | |

(Continued)

FOREIGN PATENT DOCUMENTS

| | | |
|---|---|---|
| EP | 1752573 B8 | 7/2010 |
| EP | 2828156 B1 | 5/2018 |
| WO | 2022000044 A1 | 1/2022 |

OTHER PUBLICATIONS

Keder Solutions, URL: https://www.kedersolutions.com/products/, Downloaded Jan. 20, 2022, 4 pages.

(Continued)

*Primary Examiner* — Mark R Wendell
(74) *Attorney, Agent, or Firm* — Suiter Swantz pc llo

(57) ABSTRACT

An aircraft seat diaphragm includes a pre-stretched elastomeric fabric. The elastomeric fabric is bonded to a composite frame with features to insert the diaphragm into aircraft seat spreaders. The composite frame defines a rear extension that extends up along the rear of the seat for added support. The rear extension may correspond to a fabric portion that releasably attaches to the seat back of the aircraft seat. Rear attachment features on the composite frame engage clips on the rear of a seat cushion to hold the seat cushion in place.

14 Claims, 10 Drawing Sheets

(56) References Cited

U.S. PATENT DOCUMENTS

| | | | | |
|---|---|---|---|---|
| 2003/0094838 A1* | 5/2003 | Williamson | ....... | B64D 11/0696 |
| | | | | 297/232 |
| 2011/0101165 A1* | 5/2011 | Fullerton | ............... | B64D 11/06 |
| | | | | 244/122 R |
| 2013/0127227 A1* | 5/2013 | Oleson | ................... | B64D 11/06 |
| | | | | 297/452.49 |
| 2015/0239566 A1 | 8/2015 | Laib et al. | | |
| 2020/0130847 A1* | 4/2020 | Lozano Segura | ........ | B60N 2/68 |
| 2021/0353476 A1 | 11/2021 | Lafleche et al. | | |

OTHER PUBLICATIONS

Extended European Search Report dated Jul. 13, 2023; European Application No. 231621780.

\* cited by examiner

COMPOSITE SEAT BOTTOM DIAPHRAGM

BACKGROUND

Aircraft seats often employ a fabric-based diaphragm to support a seat cushion and passenger. Such diaphragms are difficult to install because they require stretching during installation, and they wear out rapidly. It would be advantageous to have an aircraft seat diaphragm that was easier to install and offered a longer service life than existing diaphragms.

SUMMARY

In one aspect, embodiments of the inventive concepts disclosed herein are directed to an aircraft seat diaphragm with a pre-stretched elastomeric fabric. The elastomeric fabric is bonded to a composite frame with features to insert the diaphragm into aircraft seat spreaders.

In a further aspect, the composite frame defines a rear extension that extends up along the rear of the seat for added support. The rear extension may correspond to a fabric portion that releasably attaches to the seat back of the aircraft seat.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
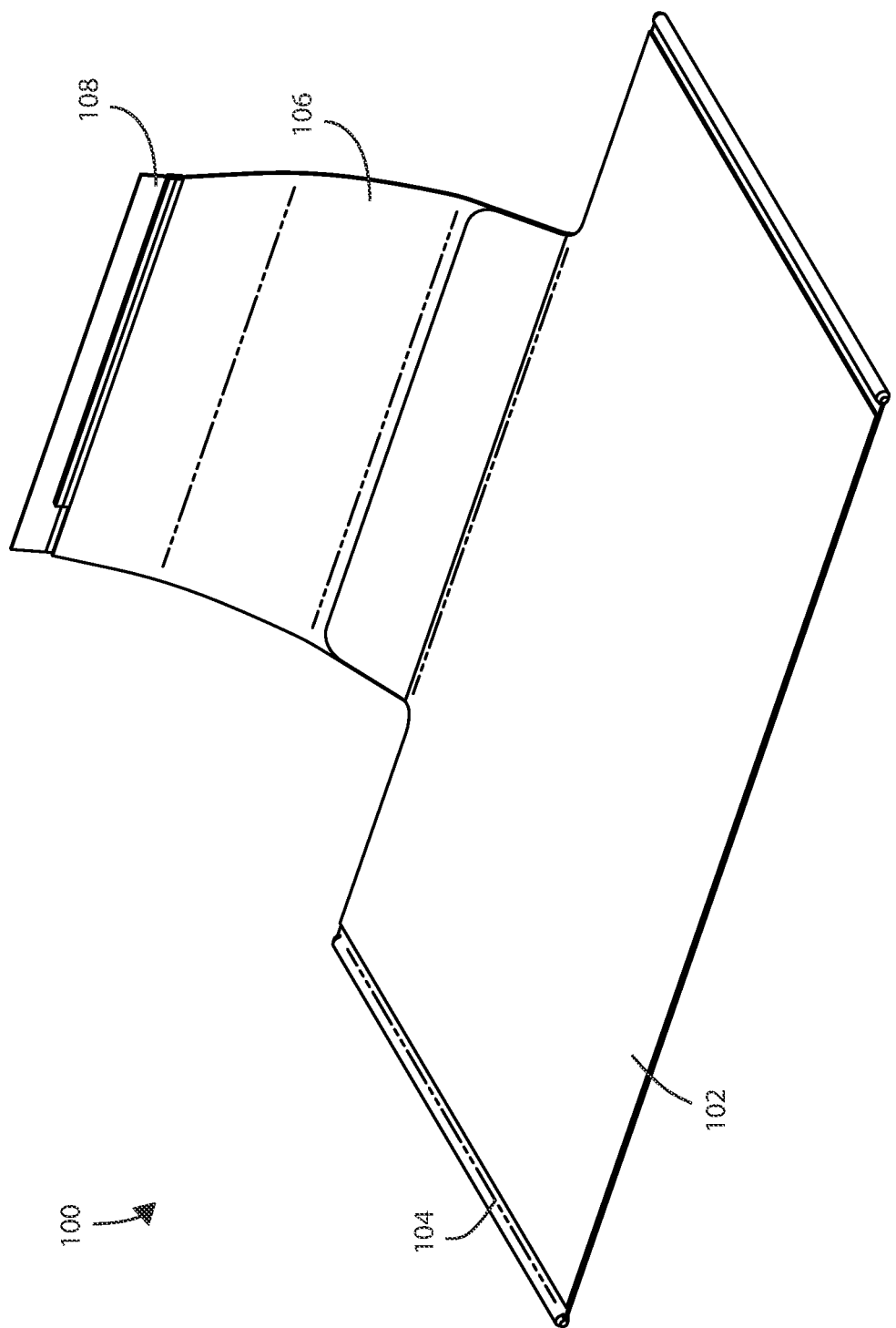
FIG. 1 shows a perspective view of a seat diaphragm according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft seat diaphragm with a pre-stretched elastomeric fabric. The elastomeric fabric is bonded, via a co-molding process, to a composite frame with features to insert the diaphragm into aircraft seat spreaders. The composite frame defines a rear extension that extends up along the rear of the seat for added support. The rear extension may correspond to a fabric portion that releasably attaches to the seat back of the aircraft seat.

Referring to FIG. 1, a perspective view of a seat diaphragm 100 according to an exemplary embodiment is shown. The seat diaphragm 100 includes a pre-stretched elastomeric fabric 102 bonded to a composite frame (obscured) that maintains tension in the pre-stretched elastomeric fabric 102. The composite frame defines attachment elements 104 that secure the composite frame (and thereby the pre-stretched elastomeric fabric 102) to seat spreaders. In at least one embodiment, the elastomeric fabric 102 is comprised of Dymetrol; alternatively, or in addition, the elastomeric material 102 may be comprised of CrystalFlex lite. Other pre-stretchable/pre-tensionable materials may be used provided they are suitable for aircraft seat diaphragms and bonding to a composite frame.

In at least one embodiment, the seat diaphragm 100 includes a rear fabric extension 106. The rear fabric extension 106 may be an extension of the pre-stretched elastomeric fabric 102 or a separate fabric element, also bonded to the composite frame. Likewise, the rear fabric extension 106 may not be pre-stretched (tensioned). In at least one embodiment, the rear fabric extension 106 includes a seat back attachment element 108 to releasably attach the rear fabric extension 106 to an aircraft seat back. In at least one embodiment, the seat back attachment element 108 may comprise a zipper oriented to engage a corresponding zipper attached to the aircraft seat back.

Figure 2:
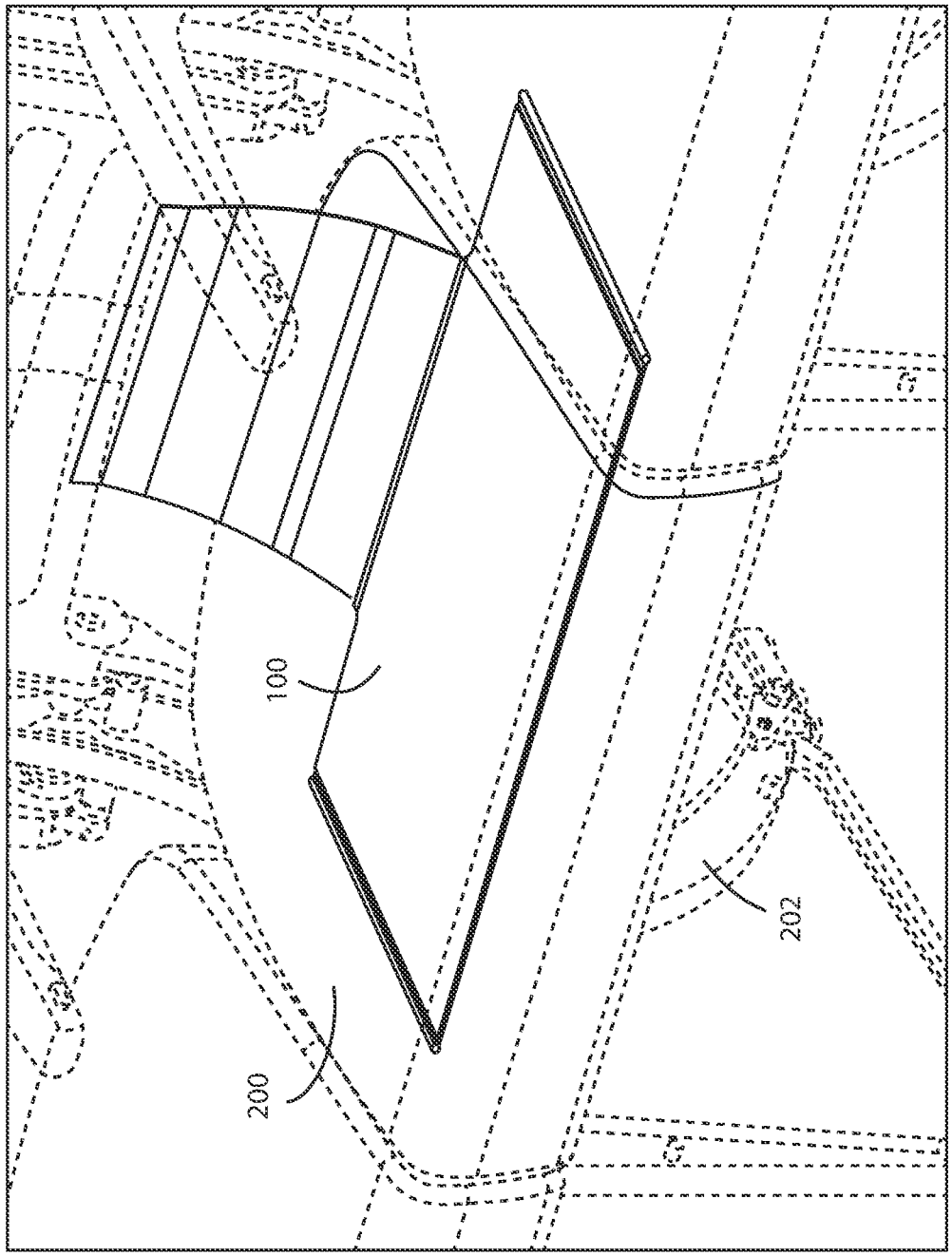
FIG. 2 shows a perspective, environmental view of a seat diaphragm according to an exemplary embodiment.

Referring to FIG. 2, a perspective, environmental view of a seat diaphragm 100 according to an exemplary embodiment is shown. The seat diaphragm 100 engages seat spreaders 202 to support a seat cushion 200 (and passenger). The composite frame, in addition to maintaining tension in the pre-stretched elastomeric fabric, also supports some of the load of the seat cushion 200 and passenger at the periphery, reducing the load on the pre-stretched elastomeric fabric and thereby improving the service life of the seta diaphragm 100.

Figure 3:
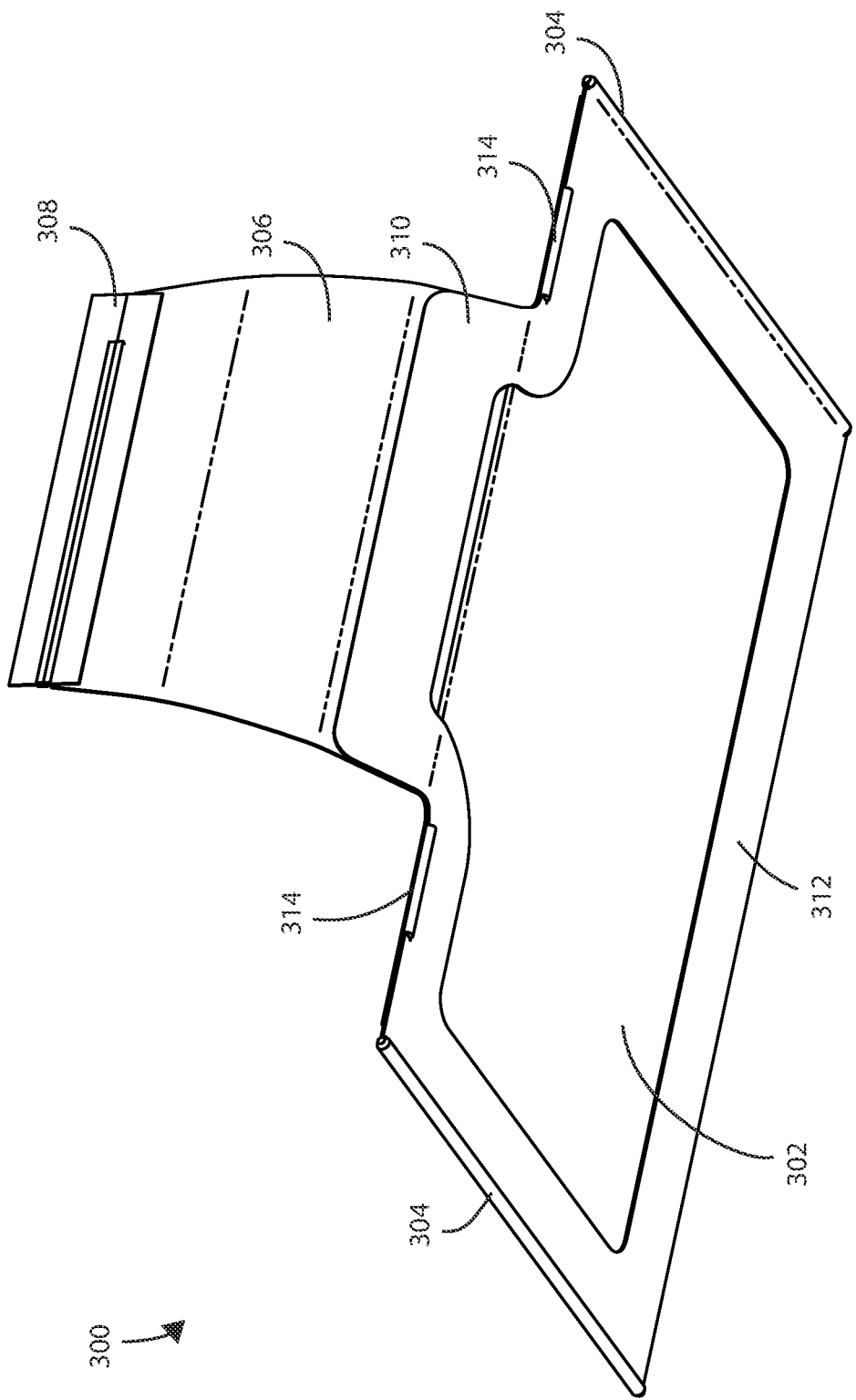
FIG. 3 shows a perspective view of a seat diaphragm according to an exemplary embodiment.

Referring to FIG. 3, a perspective view of a seat diaphragm 300 according to an exemplary embodiment is shown. The seat diaphragm 300 includes a pre-stretched elastomeric fabric 302 bonded to a composite frame 312. The composite frame defines attachment elements 304 that secure the composite frame to seat spreaders. The seat diaphragm 300 may include a non-tensioned rear fabric extension 306 bonded to the composite frame 312. The composite frame 312 is configured to be rigid or semi-rigid in at least one dimension such that the attachment elements 304 maintain their shape sufficiently for easy insertion into a corresponding spreader.

In at least one embodiment, the rear fabric extension 306 includes a seat back attachment element 308 (such as a zipper or components of a zipper) to releasably attach the rear fabric extension 306 to an aircraft seat back. In at least one embodiment, the non-tensioned rear fabric extension 306 is bonded to a rear extension 310 of the composite frame 312. The rear extension 310 may comprise a portion of the composite frame 312 translated backward (with respect to a corresponding aircraft seat), and capable of conforming to the curvature of the rear fabric extension 306 when connected to a seat back. The shape of the composite frame 312 including the rear extension 310 produces a pressure map that is more desirable than a strictly rectangular composite frame 312. It may be appreciated that a continuous curved transition between the rear portion of the composite frame 312 and the rear extension 310 is desirable for comfort and for the service life of the seat diaphragm 300.

In at least one embodiment, the composite frame 312 may include seat cushion attachment elements 314. The seat cushion attachment elements 314 are disposed to engage corresponding attachment clips disposed on a bottom rear surface of a corresponding seat cushion.

Figure 4:
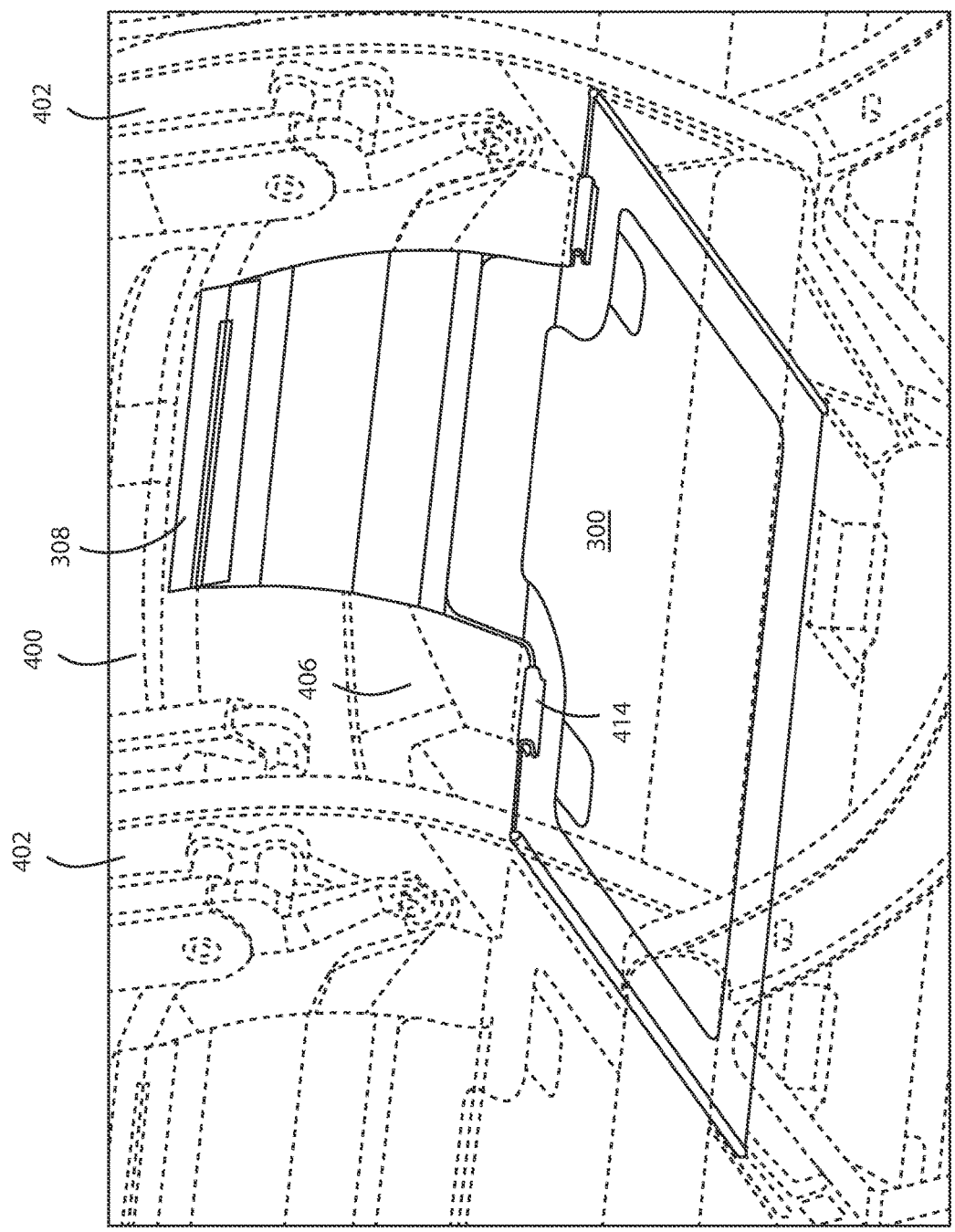
FIG. 4 shows a perspective, environmental view of a seat diaphragm according to an exemplary embodiment.

Referring to FIG. 4, a perspective, environmental view of a seat diaphragm 300 according to an exemplary embodiment is shown. The seat diaphragm 300 engages seat spreaders 402 to support a seat cushion 406. The seat cushion 406 is maintained in position via one or more attachment clips 414 disposed on the seat cushion 406.

In at least one embodiment, a rear fabric extension is releasably attached to a corresponding seat back 400 via a seat back attachment element 308. The seat back attachment element 308 provides a further support structure to seat diaphragm 300.

Figure 5:
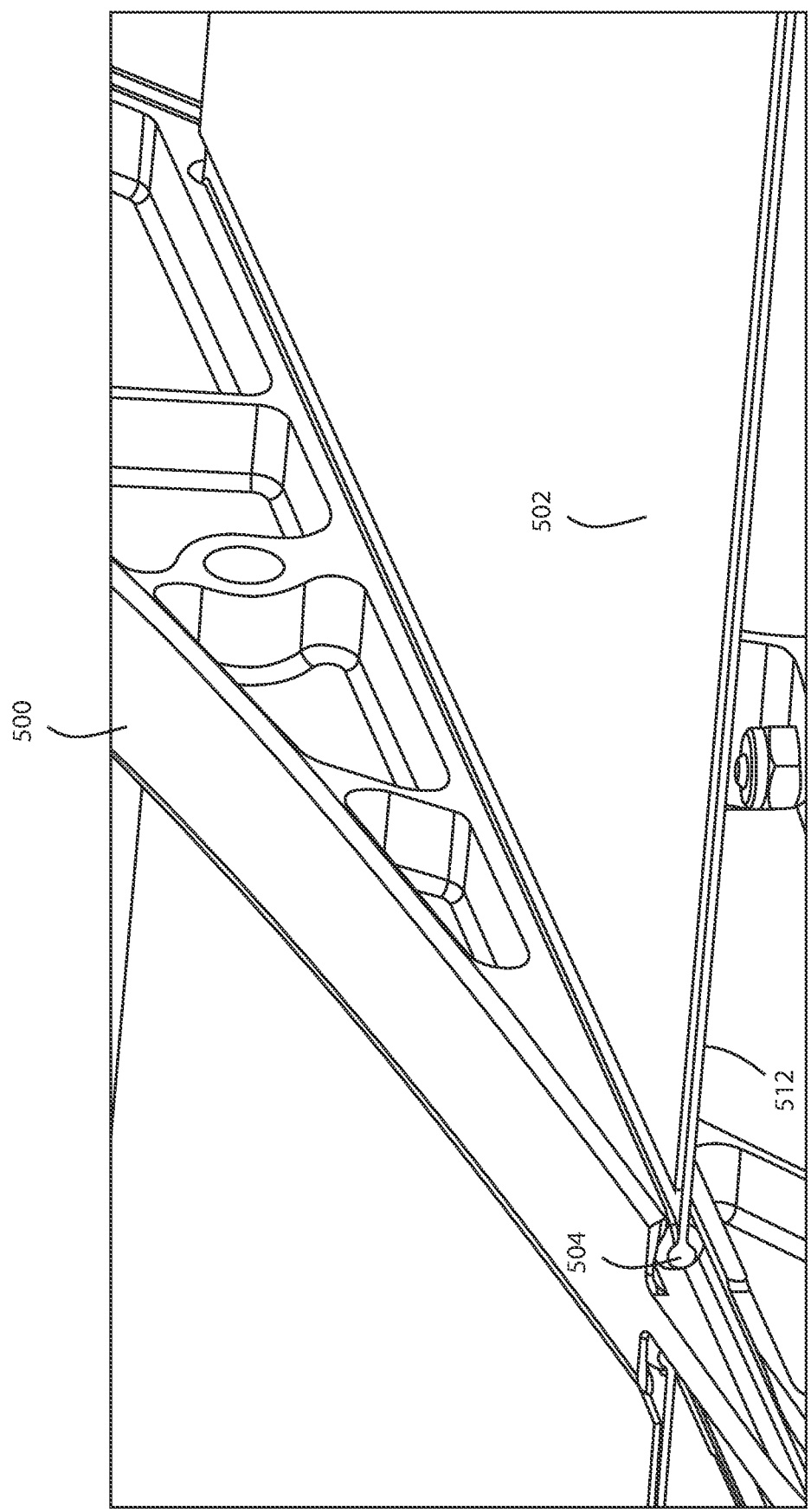
FIG. 5 shows a perspective, detail view of a seat diaphragm according to an exemplary embodiment.

Referring to FIG. 5, a perspective, detail view of a seat diaphragm according to an exemplary embodiment is shown. In at least one embodiment, the seat diaphragm includes a pre-stretched elastomeric fabric 502 bonded to a composite frame 512. The composite frame 512 defines spreader attachment elements 504 configured to engage corresponding spreaders 500 to define a seat cushion surface. In at least one embodiment, the spreader attachment elements 504 may comprise a rail or keder configured to engage a channel defined by the corresponding spreader. Because the elastomeric fabric 502 is pre-stretched, and tension is maintained by the composite frame 512, the seat diaphragm may be installed in the spreaders 500 without the need to simultaneously stretch the seat fabric, making installation easier than existing seat diaphragms.

Figure 6:
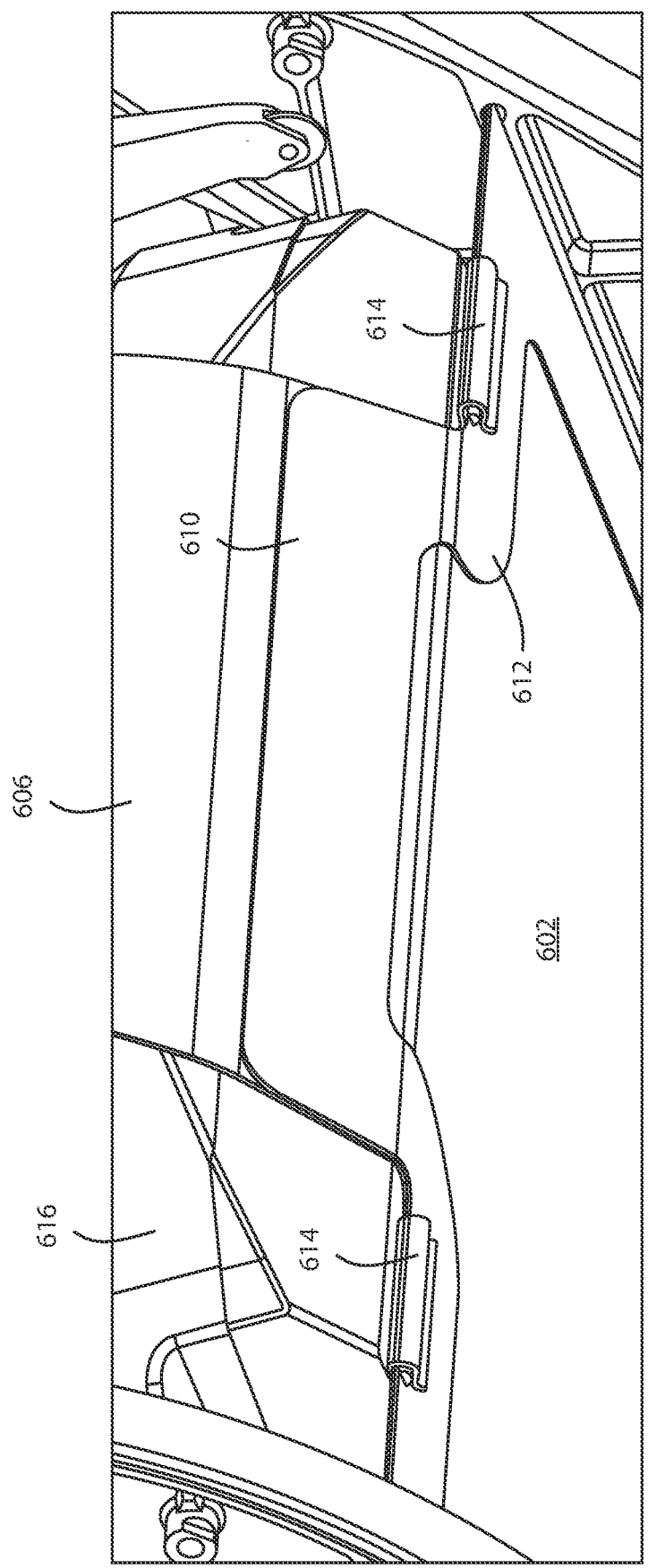
FIG. 6 shows a perspective, detail view of a seat diaphragm according to an exemplary embodiment.

Referring to FIG. 6, a perspective, detail view of a seat diaphragm according to an exemplary embodiment is shown. The seat diaphragm 600 includes a pre-stretched elastomeric fabric 602 bonded to a composite frame 612 configured to be installed between two seat spreaders. The seat diaphragm 600 may include a non-tensioned rear fabric extension 606 bonded to a rear extension 610 of the composite frame 612.

In at least one embodiment, the composite frame 612 may include seat cushion attachment elements disposed to engage corresponding attachment clips 614 disposed on a bottom rear surface of a corresponding seat cushion 616.

Figure 7:
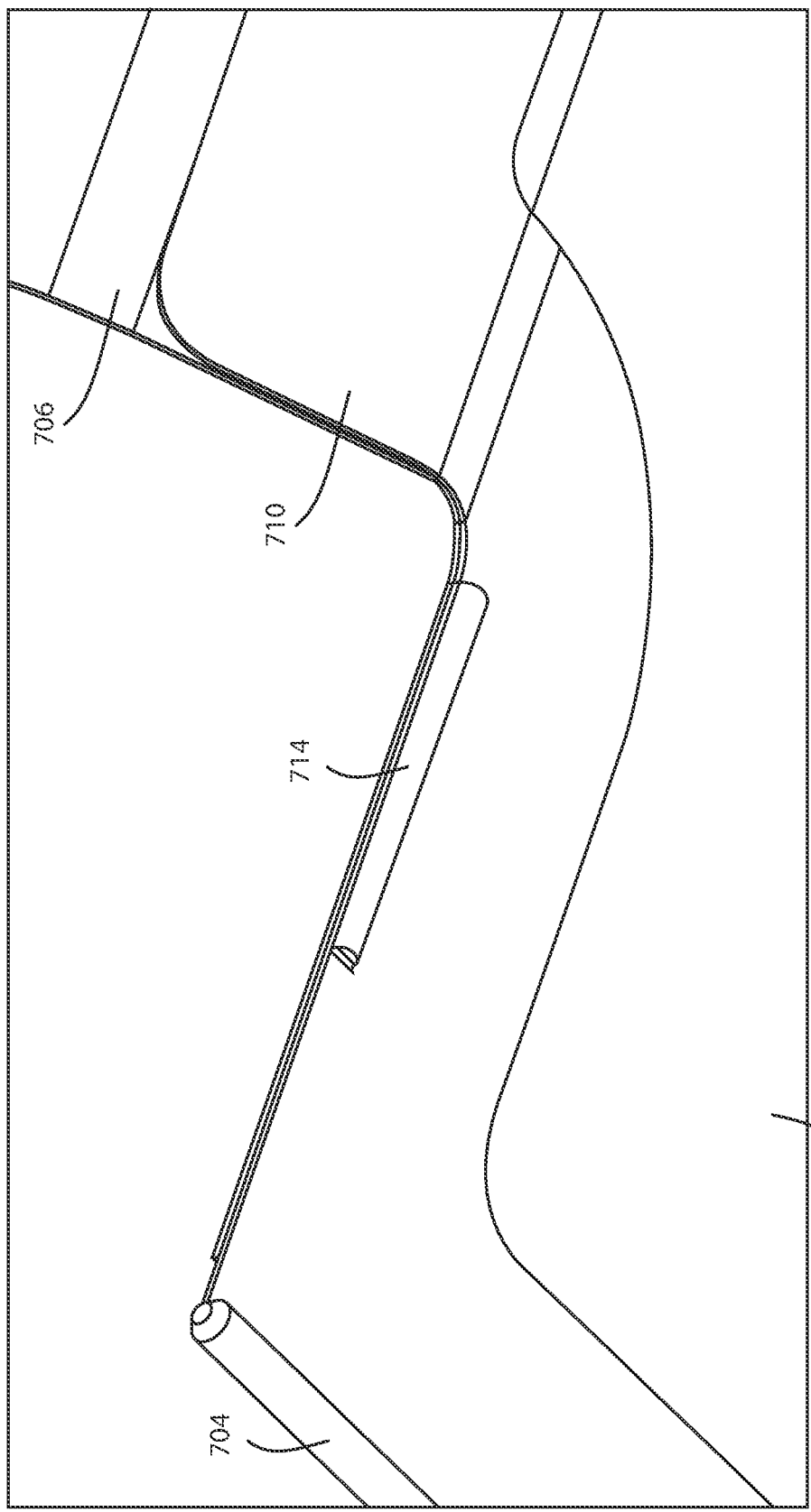
FIG. 7 shows a perspective, detail view of a seat diaphragm according to an exemplary embodiment.

Referring to FIG. 7, a perspective, detail view of a seat diaphragm according to an exemplary embodiment is shown. The seat diaphragm 700, including a pre-stretched elastomeric fabric 702 bonded to a composite frame 712 and a non-tensioned rear fabric extension 706 bonded to a rear extension 710 of the composite frame 712, includes seat cushion attachments elements 714. The seat cushion attachment elements 714 may comprise extruded or distended portions integrated into the composite frame 712. In at least one embodiment, the seat cushion attachments elements 714 may operate in concert with a corresponding front frame structure, tube, or beam of the aircraft seat to limit or prevent both forward and backward movement of the seat cushion. As described more fully herein.

Figure 8:
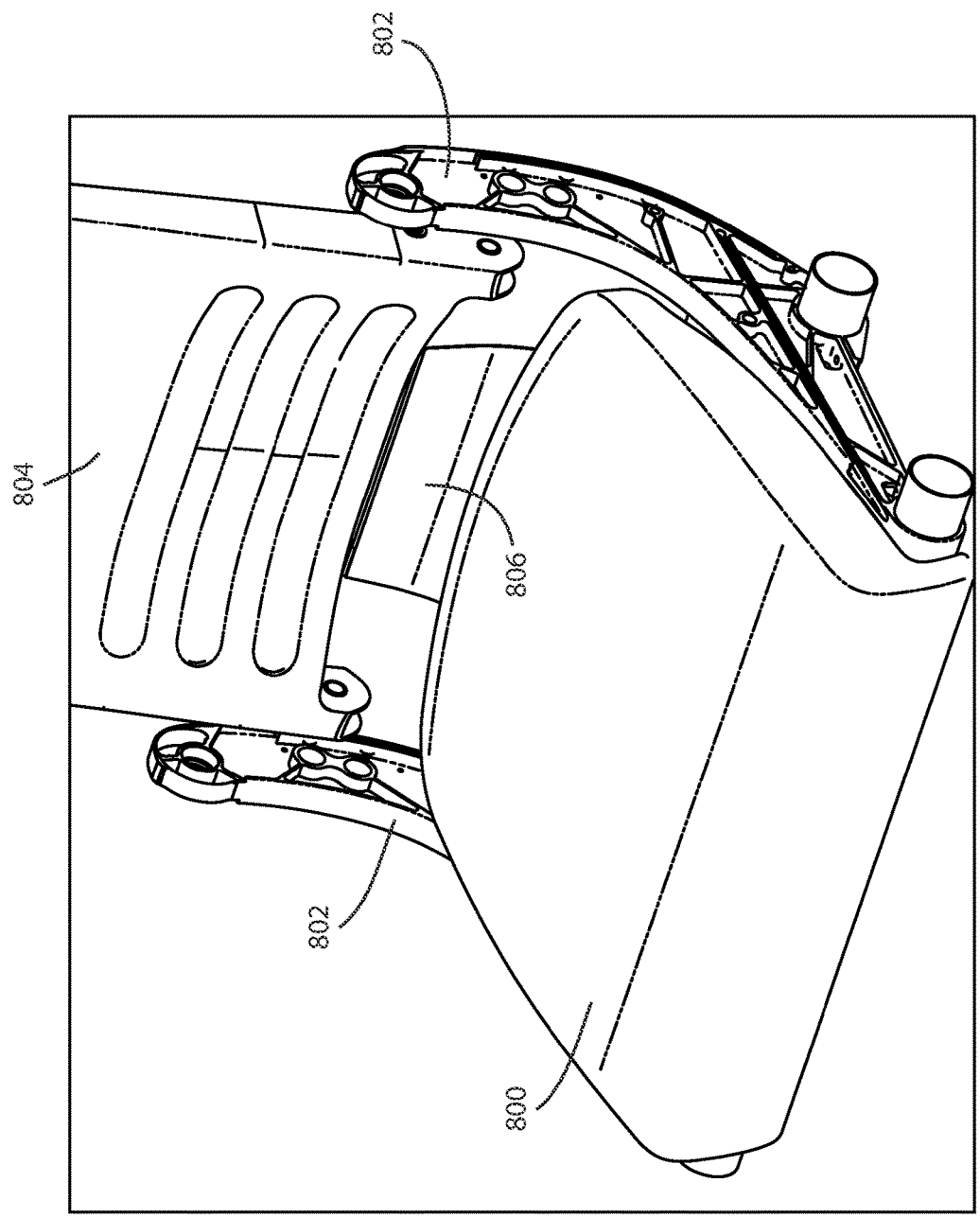
FIG. 8 shows a perspective, environmental view of a seat diaphragm according to an exemplary embodiment.
Figure 9:
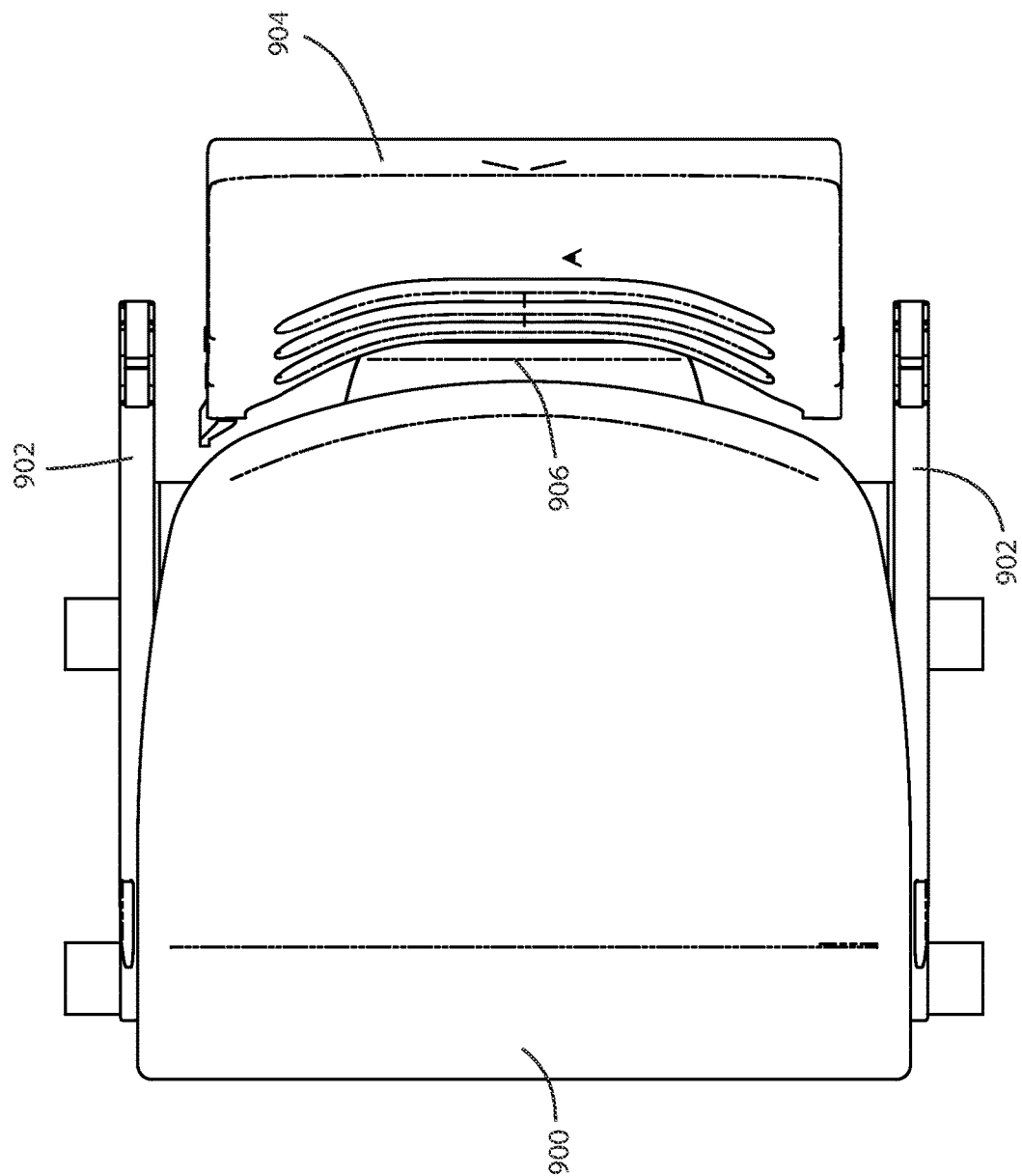
FIG. 9 shows a top, environmental view of a seat diaphragm according to an exemplary embodiment.

Referring to FIGS. 8 and 9, a perspective and top, environmental view of a seat diaphragm according to an exemplary embodiment are shown. The seat comprises spreaders 802, 902 that support a seat back 804, 904 and a seat diaphragm (obscured) with a rear fabric portion 806, 906 releasably connecting the seat diaphragm to the seat back 804, 904. A seat cushion 800, 900 is disposed on the seat diaphragm, and in at least one embodiment, held in place via seat cushion attachment elements and clips disposed to engage on the seat diaphragm, and a front seat frame engaging section of the seat cushion 800, 900.

Figure 10:
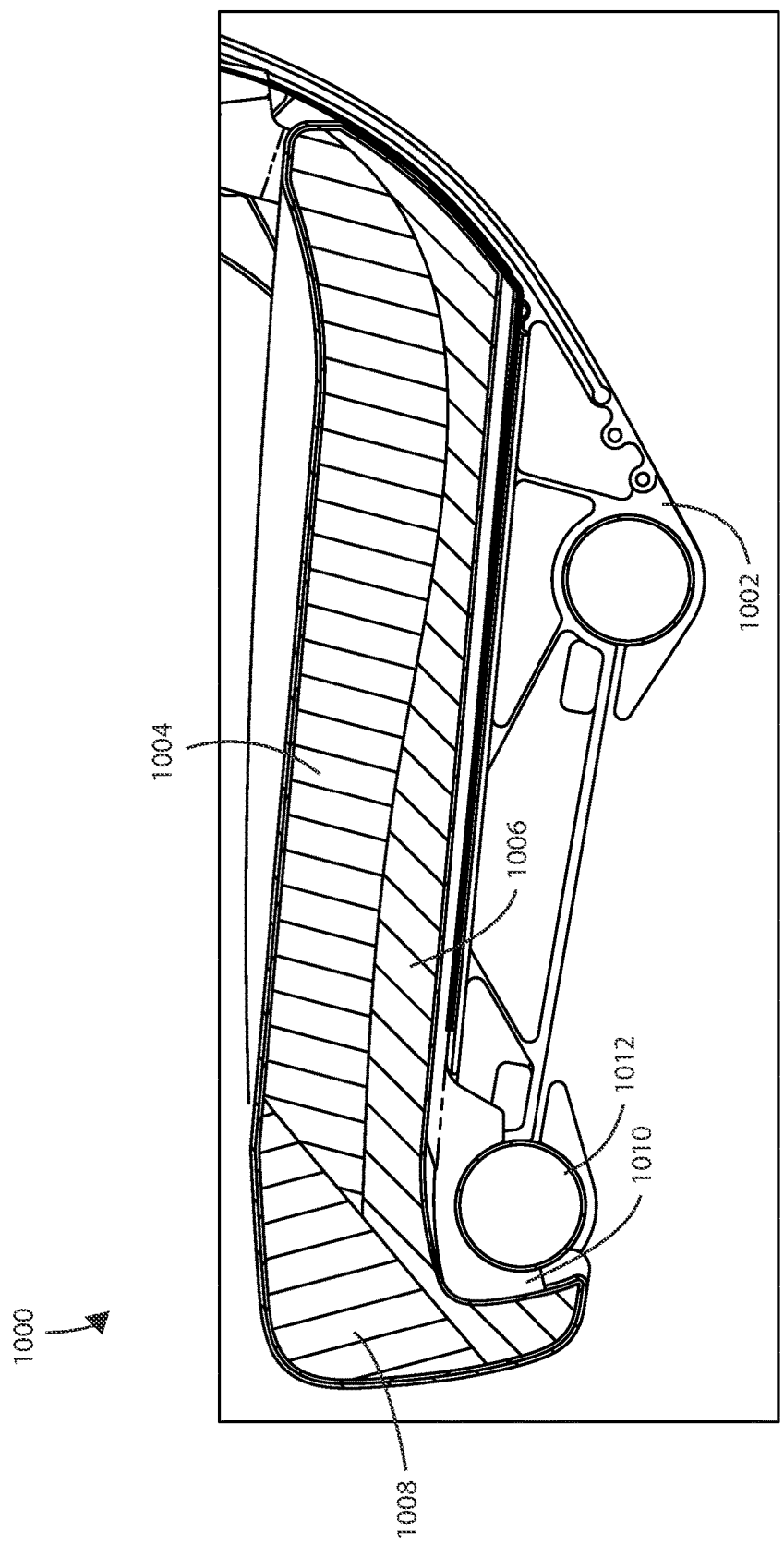
FIG. 10 shows a side, partial view of a seat cushion according to an exemplary embodiment.

Referring to FIG. 10, a side, partial view of a seat cushion 100 according to an exemplary embodiment is shown. An aircraft seat includes two spreaders 1002 configured to support a seat diaphragm. The diaphragm supports a load from the corresponding seat cushion 1000.

In at least one embodiment, the seat cushion 1000 may include attachment features, such as clips, to engage the diaphragm at a rear edge and prevent the seat cushion from sliding forward. Furthermore, a front portion of the seat cushion 1000 may define a forward frame attachment element 1010 configured to positively engage a forward frame element 1012 such as a tube or beam disposed between the spreaders 1002 at a forward portion of the seat. The forward frame element 1012 works to absorb some of the passenger load, thereby reducing the load on the diaphragm. The forward frame attachment element 1010 is configured to snap over the forward frame element 1012 when the attachment features are engaged to the diaphragm. The seat cushion 1000 may be removed for replacement or servicing the diaphragm by lifting the front of the seat cushion to disengage the forward frame attachment element 1010, then sliding the seat cushion 1000 backward to disengage the attachment features.

In at least one embodiment, the seat cushion 1000 comprises a lower portion 1006 of expanded polypropylene structural foam configured to provide more rigidity and load bearing than other portions of the seat cushion 1000. Furthermore, the expanded polypropylene structural foam may define forward frame attachment element 1010; that is, the forward frame attachment element 1010 may define a shape configured to snap over the forward frame element 1012.

In at least one embodiment, the seat cushion 1000 includes an upper portion 1004 of polyurethane foam configured for passenger comfort. Furthermore, the seat cushion 1000 may define a forward portion 1008 of polyurethane foam with a softer formulation than the upper portion 1004 for enhanced passenger comfort.

Embodiments of the present disclosure provide added longevity and passenger comfort. The bulk of the occupant load is resolved via the composite frame. The cushion offers a hybrid approach by resting on the diaphragm and the structural forward-most beam of the seat frame.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A seat diaphragm comprising:
a rectangular semi-rigid composite frame;
a pre-stretched elastomeric fabric bonded to the semi-rigid composite frame[,]; and
a rear fabric extension,
wherein the semi-rigid composite frame defines a plurality of spreader attachment elements, each configured to engage a corresponding spreader and support a seat cushion and passenger, and defines a rear extension bonded to the rear fabric extension, the rear extension being a segment of the semi-rigid frame translated toward the rear fabric extension and conforming to a curvature of the rear fabric extension.

2. The seat diaphragm of claim 1, wherein the semi-rigid frame defines a constant width.

3. The seat diaphragm of claim 1, further comprising a releasable seat back attachment element disposed on a distal edge of the rear fabric extension, the releasable seat back attachment element configured to releasably attach the rear fabric extension to a seat back.

4. The seat diaphragm of claim 1, further comprising one or more seat cushion attachment points disposed at a rear edge of the semi-rigid frame, the one or more seat cushion attachment points configured to releasably engage attachment clips disposed on a rear, bottom surface of the seat cushion.

5. The seat diaphragm of claim 1, wherein the spreader attachment elements comprise linear rails, each configured to engage a channel defined by the corresponding spreader.

6. An aircraft seat comprising:
two spreaders; and
a seat diaphragm comprising:
a rectangular semi-rigid composite frame;
a pre-stretched elastomeric fabric bonded to the semi-rigid composite frame[,]; and
a rear fabric extension,
wherein the semi-rigid composite frame defines a plurality of spreader attachment elements, each configured to engage a corresponding spreader, and defines a rear extension bonded to the rear fabric extension, the rear extension being a segment of the semi-rigid frame translated toward the rear fabric extension and conforming to a curvature of the rear fabric extension.

7. The aircraft seat of claim 6, wherein the semi-rigid frame defines a constant width.

8. The aircraft seat of claim 6, further comprising a seat back, wherein the seat diaphragm further comprises a releasable seat back attachment element disposed on a distal edge of the rear fabric extension, the releasable seat back attachment element configured to releasably attach the rear fabric extension to the seat back.

9. The aircraft seat of claim 6, further comprising a seat cushion, wherein the seat diaphragm further comprises one or more seat cushion attachment points disposed at a rear edge of the semi-rigid frame, the one or more seat cushion attachment points configured to releasably engage attachment clips disposed on a rear, bottom surface of the seat cushion.

10. The aircraft seat of claim 6, wherein the spreader attachment elements comprise linear rails, each configured to engage a channel defined by the corresponding spreader.

11. An aircraft seat comprising:
two spreaders, each defining a seat diaphragm channel; and
a seat diaphragm comprising:
a rectangular semi-rigid composite frame;
a pre-stretched elastomeric fabric bonded to the semi-rigid composite frame[,]; and
a rear fabric extension,
wherein the semi-rigid composite frame defines a plurality of linear rails, each configured to engage a seat diaphragm channel, and defines a rear extension bonded to the rear fabric extension, the rear extension being a segment of the semi-rigid frame translated toward the rear fabric extension and conforming to a curvature of the rear fabric extension.

12. The aircraft seat of claim 11, wherein the semi-rigid frame defines a constant width.

13. The aircraft seat of claim 11, further comprising a seat back, wherein the seat diaphragm further comprises a releasable seat back attachment element disposed on a distal edge of the rear fabric extension, the releasable seat back attachment element configured to releasably attach the rear fabric extension to the seat back.

14. The aircraft seat of claim 11, further comprising a seat cushion, wherein the seat diaphragm further comprises one or more seat cushion attachment points disposed at a rear edge of the semi-rigid frame, the one or more seat cushion attachment points configured to releasably engage attachment clips disposed on a rear, bottom surface of the seat cushion.

\* \* \* \* \*